United States Patent [19]

Johnson

[11] 4,060,438

[45] Nov. 29, 1977

[54] PROCESS FOR IMPARTING COLOR ON A DISCRETE BASIS TO THE THERMALLY FUSED PORTION OF QUILTED SYNTHETIC RESINOUS MATERIALS

[75] Inventor: Charles A. Johnson, Rockingham, N.C.

[73] Assignee: Home Curtain Corporation, Far Rockaway, N.Y.

[21] Appl. No.: 719,910

[22] Filed: Sept. 2, 1976

[51] Int. Cl.² .................... B32B 31/20; B32B 31/22
[52] U.S. Cl. .................... 156/73.1; 8/2.5 R; 5/334 R; 112/420; 156/234; 156/238; 156/580.2; 264/69; 428/197; 428/207
[58] Field of Search .............. 156/73.1, 234, 238, 156/580.1, 240, 93, 580.2; 112/420; 5/334 R, 345, 335, 365; 428/197, 206, 207; 264/69; 8/2.5 R

[56] References Cited

U.S. PATENT DOCUMENTS

| 3,017,642 | 1/1962 | Rosenberg et al. | 5/349 |
| 3,366,971 | 2/1968 | Scherz | 112/420 |
| 3,504,387 | 7/1970 | Hummel | 5/335 |
| 3,808,080 | 7/1974 | Parry | 156/580.1 |
| 3,879,256 | 4/1975 | Rust | 156/73.1 |
| 3,954,074 | 5/1976 | Wildeman | 112/420 |

Primary Examiner—Edward G. Whitby
Attorney, Agent, or Firm—Charles E. Temko

[57] ABSTRACT

A process for transferring dyestuff from a transfer paper substrate to a sealed area on a laminated textile material such as a quilt. The process makes possible, for example, the simulation of a colored thread stitch by coloring the sealed area as the seal is performed. Normally, the sealing is accomplished by ultrasonic means, but other forms of energy for sealing purposes may be utilized.

6 Claims, 4 Drawing Figures

PROCESS FOR IMPARTING COLOR ON A DISCRETE BASIS TO THE THERMALLY FUSED PORTION OF QUILTED SYNTHETIC RESINOUS MATERIALS

BACKGROUND OF THE INVENTION

It is known in the art to impart color to a fused portion of fabric using the medium of sonic energy. In the prior art, the transfer is accomplished using a colored Mylar tape. The Mylar is fused to the sonic welding zone and subsequently the unfused portions of the tape are stripped. It is apparent that during this procedure, the tape is destroyed after a single use, since as an entity it becomes a part of the fused area. Because of alignment problems, the process has been both cumbersome and expensive, and has therefore not acquired commercial acceptance.

SUMMARY OF THE INVENTION

Briefly stated, the invention contemplates the transfer of color on a discrete basis to a sealed area, while simultaneously quilting two or more layers of fusable substrate. This is accomplished using conventional dispersed dyestuff-coated transfer paper. The paper may be reused a substantial number of times without significant diminution of colored transfer quality upon the completed article. The invention also contemplates a completed article in which the sealed areas of a laminated or quilted fabric are colored to contrast with the remaining areas of the exposed surfaces of the laminate, whereby the appearance of stitched threads or other decorative motifs may be simulated. While the utilization of the invention requires thermo fuseable materials, blends of natural and synthetic fibers may also be used.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENTS

Figure 1:
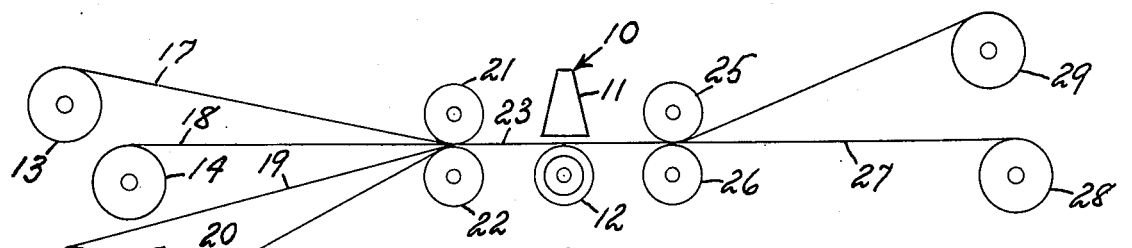
FIG. 1 is a schematic side elevational view of an apparatus performing a process embodying the invention.

In accordance with the first embodiment of the invention, the device, generally indicated by reference character 10 resembles to a considerable degree a conventional ultrasonic laminating machine, including a plurality of sonic horns, one of which is indicated by reference character 11 in FIG. 1, which coacts with a rotating anvil 12 having raised areas thereon (not shown) against which sealing takes place. Supplying the horn and anvil are a transfer paper supply 13, an upper fabric laminae supply 14, a fabric filler supply 15 and a lower fabric laminae supply 16. A continuous web emanates from each of the supplies 13–16, inclusive, as indicated by reference characters 17, 18, 19 and 20, respectively. The web 17–20, inclusive, are superimposed upon each other as the same pass through a pair of nip rollers 21 and 22, the composite web 23 being sufficiently compressed for sealing. During the sealing operation, a very small portion of the sealing energy is employed to transfer dyestuff from the paper substrate of the web 17 at sealed areas to impart a desired color to such sealed areas. If the pattern on the operative surface of the anvil 12 simulates threaded stitching, the effect created will be that of stitches made with a thread of contrasting color. The sealing area may also be in the form of adjacent circular areas, as, for example, those formed using anvils sold under the Trademark PIN-SONIC.

After the sealing operation, the juxtaposed webs may pass through a second set of nip rollers 25–26, following which the integrated webs 18–20, inclusive, and designated by reference character 27 pass to a take up roll 28. The transfer paper web 18 moves to a separate take up roll 29, which after respooling may be used again a considerable number of times.

Figure 2:
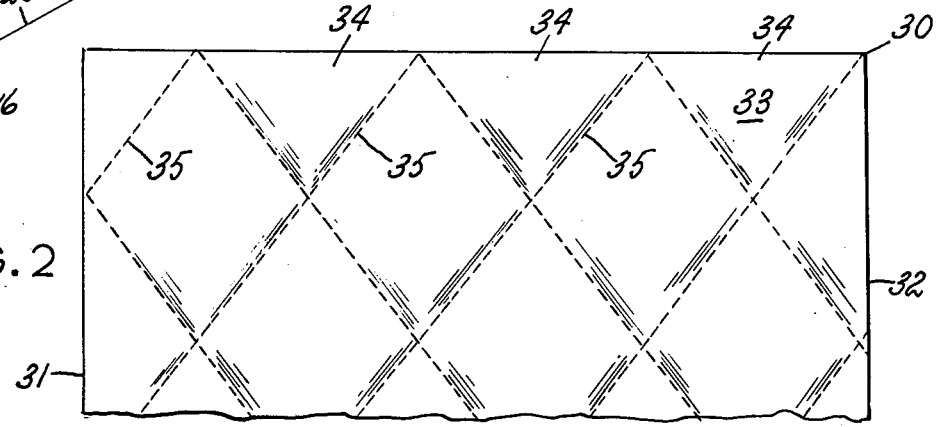
FIG. 2 is a fragmentary schematic plan view of a finished product.

FIG. 2 schematically illustrates a typical finished product generally indicated by reference character 30, in which a pair of longitudinal edges 31 and 32 border an upper surface 33 having a plurality of quilted areas 34 separated by simulated stitching 35 of contrasting color.

Turning to the first alternate form of the structure illustrated in FIG. 1, parts corresponding to those of the FIG. 1 form have been designated by similar reference characters with the additional prefix "1", thereby avoiding needless repetition.

Figure 3:
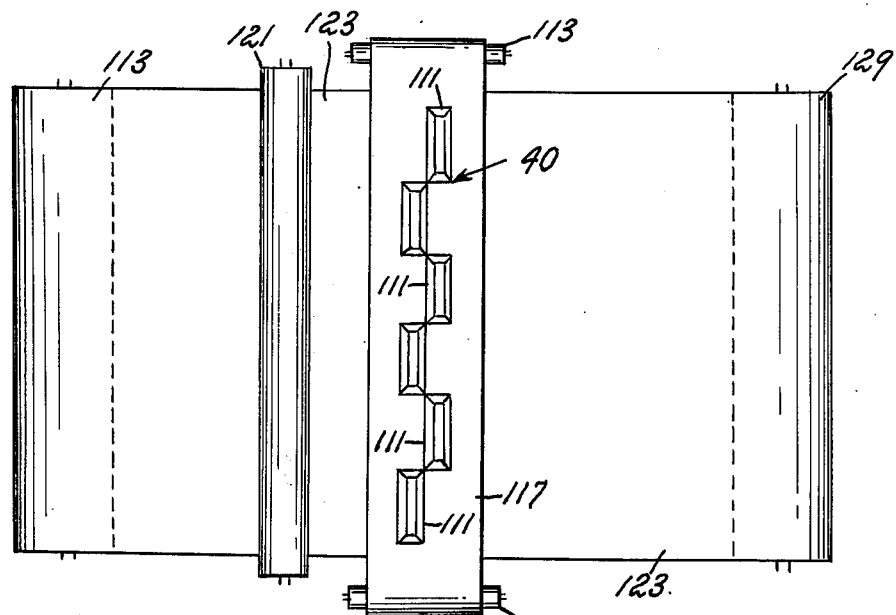
FIG. 3 is a schematic plan of an alternate form of apparatus.

The embodiment of FIG. 3 differs from the embodiment of FIG. 1 in the relocation of the transfer paper supply 113 and transfer paper take up roll 129 so that the web 117 is fed at right angles to the direction of movement of the composite web 123.

One advantage is the ability to utilize transfer paper of a web with substantially less than that of the width of the composite web. The invention contemplates the sealing of webs of a width up to the maximum capacity of the device 40, and also the use of commercially available dyestuff-coated transfer papers which are not always manufactured in correspondingly wide widths.

Another advantage is that by feeding the transfer paper as shown in FIG. 3, it is possible to provide a speed of movement in the transfer paper web which is a submultiple of that of the composite web, whereby consumption of transfered dyestuff is completed with a single pass through the sealing zone, making it unnecessary to rewind the transfer paper and use it a second time.

Figure 4:
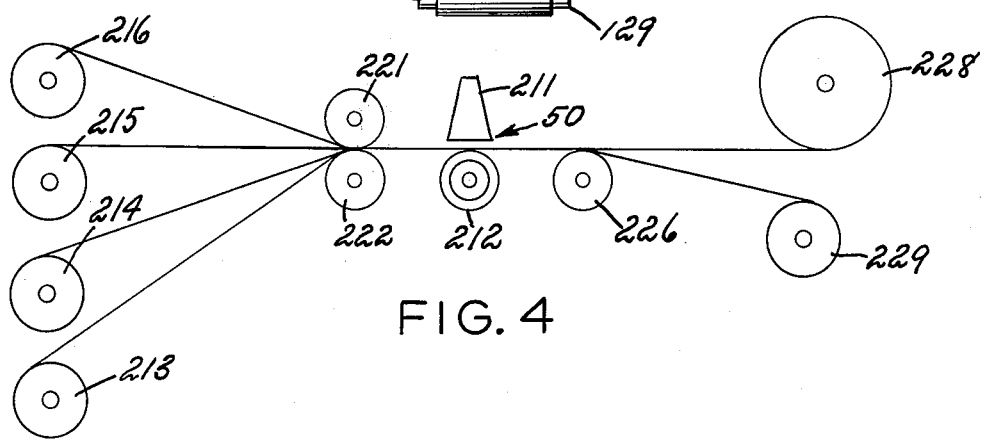
FIG. 4 is a schematic side elevational view showing a second alternate form of apparatus.

Turning to the third embodiment shown in FIG. 4 in the drawing, and generally indicated by reference character 50, parts corresponding to those of the principal embodiment have been designated by similar reference characters with the additional prefix "2".

Whereas in the principal embodiment, the transfer paper is positioned so as to be adjacent the sonic horn with the fabric face up, with suitable changes in power and amplitude settings of the ultrasonic sealing means, it is possible to effect transfer with the paper adjacent the pattern roll with the fabric face down. The principal embodiment appears to perform in a superior fashion, indicating that the dyestuff transfers from the paper substrate at least partially as a result of the mechanical effect of sonic impingement, rather than mere sublimation.

I wish it to be understood that I do not consider the invention limited to the precise details of structure shown and set forth in this specification, for obvious modifications will occur to those skilled in the art to which the invention pertains.

I claim:

1. A process for imparting color to fused portions of a quilted laminate comprising the steps of: providing quilting means including a sealing location for effecting fusing of a plurality of heat sealable laminae on a continuous basis; providing a source of web supply for each of said plurality of laminae; providing a source of web supply of a dyestuff-coated transfer paper; bringing said laminae and said transfer paper into superimposed proximity and moving the same past said sealing location, whereby said laminae are simultaneously sealed and a quantity of dyestuff is transferred to an exposed surface of the resulting laminae in the areas where sealing is effected.

2. The process as defined in claim 1, in which said sealing location includes cooperating sonic horn and rotating patterned anvil means, and in which said transfer paper is positioned adjacent said anvil, with the coated surface thereof juxtaposing an exposed surface of said laminae.

3. The process in accordance with claim 1, in which the principal axis of said web of transfer paper is parallel to the principal axes of said laminae.

4. The process in accordance with claim 1, in which the principal axis of said web of transfer paper is disposed perpendicular to the principal axes of said laminae.

5. The process in accordance with claim 1, in which the said transfer paper is fed past said sealing station at a velocity which is submultiple of the velocity at which said laminae are fed.

6. The process in accordance with claim 1, in which said transfer paper is reused.

* * * * *